United States Patent
Sawano et al.

(10) Patent No.: US 10,884,445 B2
(45) Date of Patent: Jan. 5, 2021

(54) POWER SUPPLY CONTROL DEVICE FOR MAINTAINING POWER SUPPLY TO A LOAD

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventors: Shunichi Sawano, Mie (JP); Yuuki Sugisawa, Mie (JP); Kota Oda, Mie (JP)

(73) Assignees: AutoNetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 16/277,726

(22) Filed: Feb. 15, 2019

(65) Prior Publication Data
US 2019/0258284 A1    Aug. 22, 2019

(30) Foreign Application Priority Data
Feb. 21, 2018    (JP) ................. 2018-029113

(51) Int. Cl.
| | | |
|---|---|---|
| G05F 3/24 | (2006.01) |
| G05F 5/00 | (2006.01) |
| H02M 3/155 | (2006.01) |
| H02M 3/156 | (2006.01) |

(52) U.S. Cl.
CPC ............. *G05F 3/24* (2013.01); *G05F 5/00* (2013.01); *H02M 3/155* (2013.01); *H02M 3/156* (2013.01)

(58) Field of Classification Search
CPC ................. H02M 1/36; H02M 3/155–157
See application file for complete search history.

(56) References Cited

U.S. PATENT DOCUMENTS

| | | | | |
|---|---|---|---|---|
| 2015/0346758 A1* | 12/2015 | Sakakibara | ............... | G05F 5/00 323/303 |
| 2017/0108890 A1* | 4/2017 | Nagasawa | ................. | G05F 5/00 |
| 2017/0294854 A1* | 10/2017 | Morita | ................... | H02H 7/122 |

FOREIGN PATENT DOCUMENTS

JP    2017-019363 A    1/2017

* cited by examiner

*Primary Examiner* — Kyle J Moody
*Assistant Examiner* — Lakaisha Jackson
(74) *Attorney, Agent, or Firm* — Honigman LLP

(57) ABSTRACT

A power supply control device includes a switch disposed in a first current path of a current flowing from a battery. A first comparator compares a voltage value of a current input end of the switch to which the current is inputted with a voltage threshold. When the voltage value of the current input end is less than the voltage threshold, a drive circuit turns off the switch. The battery supplies, via a second current path, power to a starter that starts an engine of a vehicle. The voltage threshold is less than the voltage value of the current input end of the switch in the case where the battery supplies the power to the starter.

4 Claims, 7 Drawing Sheets

US 10,884,445 B2

POWER SUPPLY CONTROL DEVICE FOR MAINTAINING POWER SUPPLY TO A LOAD

CROSS-REFERENCE TO RELATED APPLICATIONS

This application claims priority of Japanese Patent Application No. JP2018-029113 filed Feb. 21, 2018, the contents of which are incorporated herein.

TECHNICAL FIELD

The present disclosure relates to a power supply control device.

BACKGROUND ART

Vehicles are equipped with a power supply control device that controls power supply to a load by turning on and off a switch disposed in a path of a current flowing from a DC (Direct-Current) power source to the load (for example, see JP 2017-19363A). The power supply control device disclosed in JP 2017-19363A includes an IPD (Intelligent Power Device) having a switch. A control signal instructing to turn the switch on or off is inputted to the IPD. In response to the control signal, the switch in the IPD is turned on or off.

The IPD has a GND terminal. The switch has a current input end receiving the current, and a current output end outputting the current. When a voltage value of the current input end of the switch with respect to a potential of the GND terminal is less than a voltage threshold, the switch in the IPD is turned off regardless of the instruction given by the control signal.

A negative terminal of the DC power source is grounded. A positive terminal of the DC power source is connected to a starter and the current input end of the switch. When the DC power source supplies power, the current is outputted via an internal resistance of the DC power source. When the starter that starts an engine is running, the DC power source supplies power to the starter without involving the IPD. Since a value of the current flowing from the DC power source to the starter is large, a large voltage drop occurs across the internal resistance. Accordingly, when the current flows from the DC power source to the starter, the value of the output voltage from the DC power source with respect to the ground potential decreases and the voltage value of the current input end of the switch with respect to the ground potential thus decreases.

When the potential of the GND terminal is equal to the ground potential and the starter is activated in this condition, the voltage value of the current input end of the switch with respect to the potential of the GND terminal becomes less than the voltage threshold. Thus, the switch in the IPD may possibly be turned off. When the switch is turned off, power supply to the load stops and the load thus stops operating. However, even when the starter is running, the load may possibly be required to operate.

With this being the situation, to prevent the load from stopping operating due to the activation of the starter, the power supply control device disclosed in JP 2017-19363A reduces the potential of the GND terminal below the ground potential when the voltage value of the current input end of the switch with respect to the ground potential decreases. With this, even when the starter is activated while the switch remains on in the IPD, the voltage value of the current input end of the switch with respect to the GND terminal does not fall below the voltage threshold. As a result, the switch remains on and power supply from the DC power source to the load continues.

Japanese Unexamined Patent Application Publication No. 2017-19363 is an example of related art.

SUMMARY

However, with the power supply control device disclosed in JP 2017-19363A, even when the output voltage value of the DC power source decreases for a reason that has nothing to do with the activation of the starter, the potential of the GND terminal decreases and the switch remains on in the IPD. For example, suppose that the two ends of the load are short-circuited while the switch is on, and that the potential of the current output end of the switch becomes equal to the ground potential. Even in this case, as in the case where the starter is running, a large current flows from the DC power source and the output voltage value of the DC power source decreases.

Here, the large current flows via the switch, instead of flowing to the starter. When the switch is a semiconductor switch, such as an FET (Field Effect Transistor) or a bipolar transistor, an on-resistance of the switch causes a large amount of heat. As a result, a temperature of the switch increases to an assumed temperature or higher, which may possibly damage the switch. Thus, when the output voltage value of the DC power source decreases due to the short circuit of the two ends of the load, the switch needs to be turned off. However, the power supply control device disclosed in JP 2017-19363A cannot appropriately turn off the switch depending on the voltage value of the current input end of the switch.

The present disclosure is conceived in view of the circumstances described above, and it is an object of the present disclosure to provide a power supply control device capable of appropriately turning off a switch depending on a voltage value of a current input end of the switch.

A power supply control device according to an aspect of the present disclosure includes: a switch disposed in a first current path of a current flowing from a direct-current (DC) power source; a comparison unit that compares a voltage value of a current input end of the switch to which the current is inputted with a voltage threshold; and a switching unit that turns off the switch when the comparison unit indicates that the voltage value of the current input end is less than the voltage threshold. The DC power source supplies, via a second current path, power to a starter that starts an engine of a vehicle. The voltage threshold is less than the voltage value of the current input end in a case where the DC power source supplies the power to the starter.

According to the above aspect, the switch is appropriately turned off depending on the voltage value of the current input end of the switch.

DETAILED DESCRIPTION OF PREFERRED EMBODIMENTS

Figure 1:
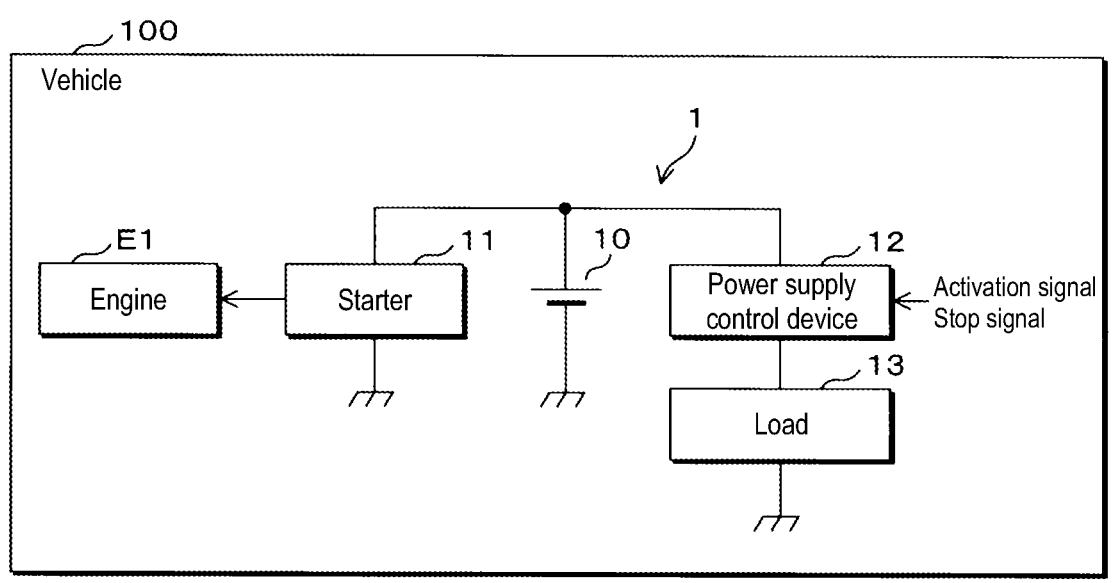
FIG. 1 is a block diagram showing a configuration of main components included in a power system according to an embodiment.

Aspects of the present disclosure are first described in detail. At least some of the embodiments described below may be freely combined.

A power supply control device according to an aspect of the present disclosure includes: a switch disposed in a first current path of a current flowing from a direct-current (DC) power source; a comparison unit that compares a voltage value of a current input end of the switch to which the current is inputted with a voltage threshold; and a switching unit that turns off the switch when the comparison unit indicates that the voltage value of the current input end is less than the voltage threshold. The DC power source supplies, via a second current path, power to a starter that starts an engine of a vehicle. The voltage threshold is less than the voltage value of the current input end in a case where the DC power source supplies the power to the starter.

According to the aspect described above, the voltage threshold is less than the voltage value of the current input end of the switch in the case where the DC power source supplies power to the starter. Accordingly, when the starter is activated, the voltage value of the current input end of the switch does not fall below the voltage threshold. Thus, activation of the starter does not cause the switch to be mistakenly turned off. Moreover, suppose that a large current flows via the switch 20 and thus the voltage value of the current input end of the switch becomes less than the voltage threshold. In this case, the switch is turned off and the passage of the current via the switch is thus interrupted. In this way, the switch is appropriately turned off depending on the voltage value of the current input end of the switch.

A power supply control device according to an aspect of the present disclosure includes: a capacitor having one end connected to the current input end of the switch; a resistance having one end connected to the other end of the capacitor; and a DC voltage source having a negative terminal connected to a connection node between the capacitor and the resistance. The voltage threshold is a voltage value of a positive terminal of the DC voltage source. The switching unit turns off the switch when the comparison unit indicates continuously for at least a predetermined period that the voltage value of the current input end is less than the voltage threshold.

According to the aspect described above, the switch is turned off when the voltage value of the current input end of the switch is less than the voltage threshold for the predetermined period. Thus, even when disturbance noise causes the voltage value of the current input end of the switch to be temporarily less than the voltage threshold, the switch is not turned off.

For example, suppose that the current output end of the switch that outputs the current is connected to one end of the load, and that the other end of the load and the other end of the resistance are grounded. Moreover, suppose that the device is configured so that when the voltage value of the current input end of the switch is less than a fixed voltage value, power supply to the switching unit is stopped. The fixed voltage value is less than the voltage threshold. The current flows from the DC power source to the capacitor and to the resistance in this order. The capacitor is charged in advance.

When the two ends of the load are short-circuited, the capacitor discharges via the switch and the potential of the connection node decreases below the ground potential. As the power accumulated in the capacitor decreases, the value of the current flowing through the resistance decreases. The potential of the connection node returns to the ground potential. Thus, the voltage value of the current input end of the switch slowly decreases. As a result, when the two ends of the load are short-circuited, power supply to the switching unit is not stopped before the period during which the voltage value of the current input end of the switch is continuously less than the voltage threshold reaches the predetermined period. The switching unit reliably turns off the switch.

A power supply control device according to an aspect of the present disclosure includes a power circuit supplying power to the switching unit. The power circuit stops power supply to the switching unit when the voltage value of the current input end of the switch is less than a predetermined voltage value. The predetermined voltage value is less than the voltage threshold.

According to the aspect described above, when the voltage value of the current input end of the switch becomes less than the predetermined voltage value, the power circuit stops power supply to the switching unit and thus the switching unit stops operating. As described above, the voltage value of the current input end of the switch slowly decreases. Thus, when the two ends of the load are short-circuited, the switching unit reliably turns off the switch before the power circuit stops power supply to the switching unit.

A power supply control device according to an aspect of the present disclosure includes: a second resistance having one end connected to the connection node; a current output circuit outputting, to the other end of the second resistance, a current increasing when a value of the current flowing via the switch increases; a second DC voltage source having a negative terminal connected to the connection node; and a second comparison unit that compares a voltage value of the other end of the second resistance with a voltage value of a positive terminal of the second DC voltage source. The switching unit turns off the switch when the second comparison unit indicates that the voltage value of the other end of the second resistance exceeds the voltage value of the positive terminal of the second DC voltage source.

According to the aspect described above, the potential of the connection node becomes lower than the ground potential when the capacitor discharges in the case where, for example, the other end of the resistance is grounded, as described above. Here, one end of the second resistance and the negative terminal of the second voltage source are connected to the connection node. Thus, regardless of the voltage value of the connection node with respect to the ground potential, the comparison is appropriately performed between the voltage value of the other end of the second resistance and the voltage value of the positive terminal of the second voltage source.

A specific example of a power system according to an embodiment of the present disclosure is described with reference to the drawings. It is intended that the scope of the present disclosure not be limited by the example, but be defined by the claims set forth below. Meanings equivalent to the description of the claims and all modifications are intended for inclusion within the scope of the following claims.

FIG. 1 is a block diagram showing a configuration of main components included in a power system 1 according to the present embodiment. The power system 1 is installed in a vehicle 100. Moreover, an engine E1 that generates power necessary to run the vehicle 100 is installed in the vehicle 100. The power system 1 includes a battery 10, a starter 11, a power supply control device 12, and a load 13. The battery 10 is a DC power source. A positive terminal of the battery 10 is connected to one end of the starter 11 and one end of the power supply control device 12. The other end of the power supply control device 12 is connected to one end of the load 13. A negative terminal of the battery 10, the other end of the starter 11, and the other end of the load 13 are grounded.

The battery 10 supplies power to the starter 11, and also to the load 13 via the power supply control device 12. Here, a current flows from the positive terminal of the battery 10 to the starter 11. This current path corresponds to a second current path. The battery 10 supplies power to the starter 11 via the second current path.

The starter 11 is a motor for activating the engine E1 and operates using power accumulated in the battery 10. The battery 10 outputs a voltage via an internal resistance (not shown). When the current flows via the internal resistance, a voltage drop occurs to the internal resistance. The larger the current flows via the internal resistance, the larger the voltage drop is. The larger the voltage drop is, the lower the output voltage value of the battery 10 is. While the starter 11 is running, the value of the current flowing from the battery 10 to the starter 11 is large. For this reason, while the starter 11 is running, the output voltage value of the battery 10 is low.

The load 13 is an electrical device. When supplied with power, the load 13 starts operating. When power supply to the load 13 stops, the load 13 stops operating. The value of the current flowing from the battery 10 to the load 13 is small. Accordingly, even when the load 13 starts operating, the output voltage value of the battery 10 hardly decreases.

An activation signal for activating operation of the load 13 and a stop signal for stopping operation of the load 13 are inputted to the power supply control device 12. When the activation signal is inputted, the power supply control device 12 electrically connects the positive terminal of the battery 10 to one end of the load 13. With this, the battery 10 supplies power to the load 13, and the load 13 thus starts operating. When the stop signal is inputted, the power supply control device 12 electrically disconnects the battery 10 from the load 13. With this, power supply from the batter 10 to the load 13 stops, and the load 13 thus stops operating.

Figure 2:
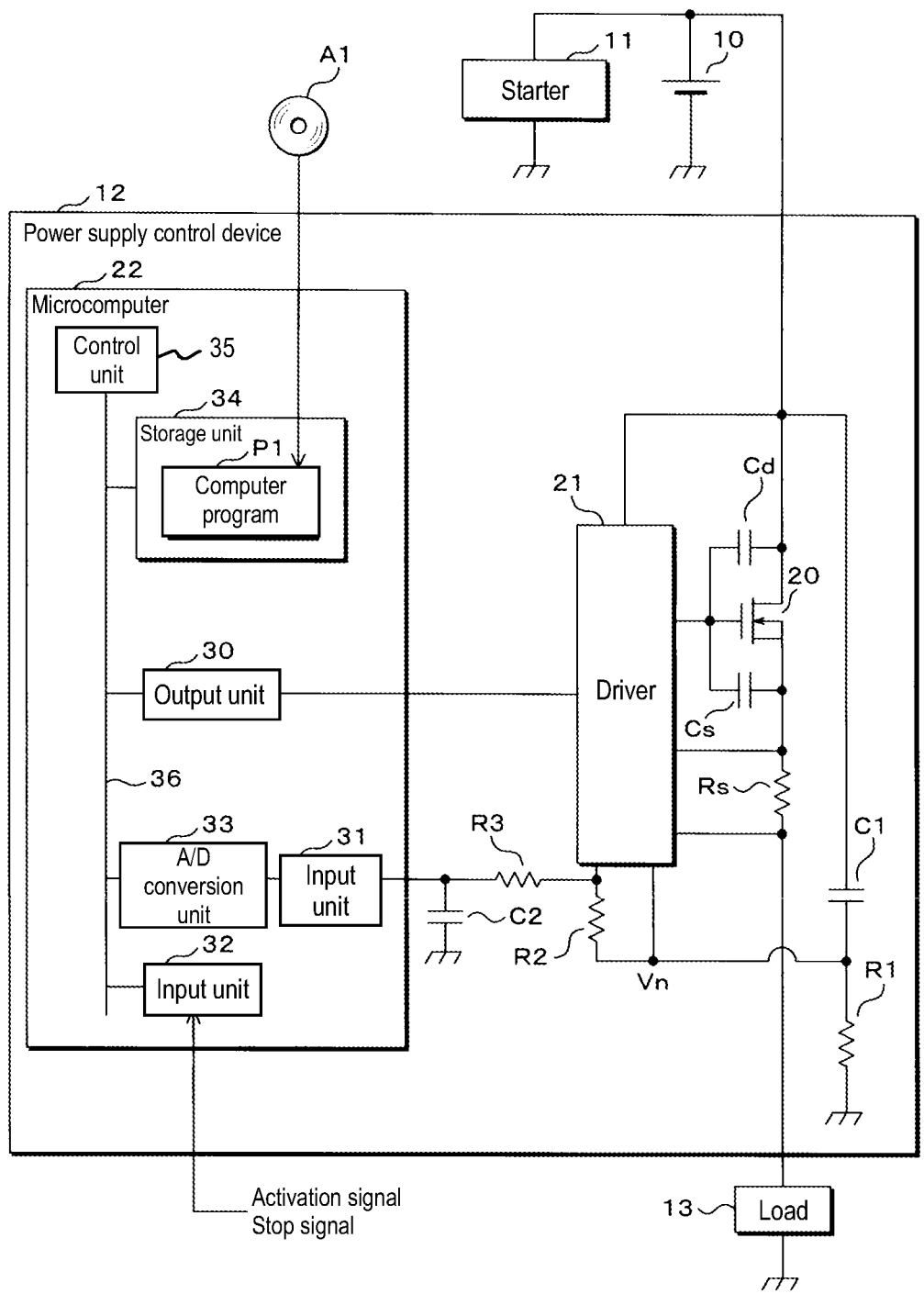
FIG. 2 is a block diagram showing a configuration of main components included in a power supply control device.

FIG. 2 is a block diagram showing a configuration of main components included in the power supply control device 12. The power supply control device 12 includes a switch 20, a driver 21, a microcomputer 22, a first capacitor C1, a second capacitor C2, a shunt resistance Rs, a first resistance R1, a second resistance R2, and a third resistance R3.

The switch 20 is an N-channel FET. When the switch 20 is manufactured, parasitic capacitances Cd and Cs are formed. The parasitic capacitance Cd is connected between a drain and a gate of the switch 20. The parasitic capacitance Cs is connected between a source and the gate of the switch 20. The microcomputer 22 includes an output unit 30, input units 31 and 32, an A/D (analog-to-digital) conversion unit 33, a storage unit 34, and a control unit 35.

The drain of the switch 20 is connected to the positive terminal of the battery 10. The source of the switch 20 is connected to one end of the shunt resistance Rs. The other end of the shunt resistance Rs is connected to one end of the load 13. The source of the switch 20, the gate of the switch 20, and both ends of the shunt resistance Rs are connected to the driver 21. The drain of the switch 20 is further connected to one end of the first capacitor C1. The other end of the first capacitor C1 is connected to one end of the first resistance R1. The other end of the first resistance R1 is grounded.

A connection node between the first capacitor C1 and the first resistance R1 is connected to the driver 21 and one end of the second resistance R2. The other end of the second resistance R2 is connected to the driver 21 and one end of the third resistance R3. The driver 21 is further connected to the output unit 30 of the microcomputer 22. The other end of the third resistance R3 is connected to the input unit 31 of the microcomputer 22 and one end of the second capacitor C2. The other end of the second capacitor C2 is grounded.

In the microcomputer 22, the input unit 31 is further connected to the A/D conversion unit 33. The output unit 30, the input unit 32, the A/D conversion unit 33, the storage unit 34, and the control 35 are connected to an internal bus 36. Hereinafter, the potential of the connection node between the other end of the first capacitor C1 and one end of the first resistance R1 is referred to as the device potential. Moreover, the voltage value of the connection node with respect to the ground potential is referred to as the device potential voltage value. In FIG. 2, the device potential voltage value is indicated as Vn.

In the switch 20, the higher the voltage value of the gate with respect to the potential of the source is, the smaller the resistance value between the drain and the gate. In the switch 20, when the voltage value of the gate with respect to the potential of the source is larger than or equal to a fixed on-voltage value, the resistance between the drain and the source is sufficiently small and thus the current can flow via the drain and the source. In this case, the switch 20 is on. In the switch 20, when the voltage value of the gate with respect to the potential of the source is less than a fixed off-voltage value, the resistance between the drain and the source is sufficiently large and thus no current flows via the drain and the source. In this case, the switch 20 is off. Here, the on-voltage value is larger than the off-voltage value.

When the switch 20 is turned on, the positive terminal of the battery 10 is electrically connected to one end of the load 13. With this, the battery 10 supplies power to the load 13. In this case, the current flows from the positive terminal of the battery 10 to the switch 20, to the shunt resistance Rs, and to the load 13 in this order. This current path corresponds to a first current path. The switch 20 is disposed in the first current path. In the switch 20, the current is inputted to the drain and outputted from the source. The drain of the switch 20 corresponds to a current input end. The source of the switch 20 corresponds to a current output end.

When the switch 20 is turned off, the positive terminal of the battery 10 is electrically disconnected from one end of the load 13 and power supply from the battery 10 to the load 13 stops.

The output unit 30 of the microcomputer 22 outputs a high-level voltage or a low-level voltage to the driver 21. In response to an instruction from the control unit 35, the output unit 30 switches the voltage outputted to the driver 21 to the high-level voltage or the low-level voltage.

Suppose that the voltage value of the source of the switch 20 with respect to the device potential satisfies a voltage condition and that the value of the current flowing through the shunt resistance Rs satisfies a current condition. In this case, the driver 21 turns on or off the switch 20 depending on the voltage outputted from the output unit 30. Hereinafter, the voltage value of the drain of the switch 20 with respect to the device potential is referred to as the input voltage value. Moreover, the value of the current flowing via the switch 20 and the shunt resistance Rs is referred to as the switch current value.

The voltage condition refers to the case where the input voltage value is larger than or equal to a first voltage threshold or where a period during which the input voltage value is continuously below the first voltage threshold is less than a first reference period that is fixed. The current condition refers to the case where the switch current value is smaller than or equal to a current threshold or where a period during which the switch current value continuously exceeds the current threshold is less than a second reference period that is fixed.

Suppose that the input voltage value and the switch current value satisfy the voltage condition and the current condition, respectively. In this case, when the output unit 30 switches the voltage outputted to the driver 21 from the low-level voltage to the high-level voltage, the driver 21 turns on the switch 20. More specifically, the driver 21 electrically disconnects the gate of the switch 20 from one end of the first resistance R1 and increases the voltage of the source of the switch 20 with respect to the device potential to a predetermined target voltage. The driver 21 outputs the increased voltage to the gate of the switch 20. With this, the parasitic capacitances Cs and Cd are charged. Thus, in the switch 20, the voltage of the gate with respect to the potential of the source becomes higher than or equal to the on-voltage. As a result, the switch 20 is turned on.

Similarly, when the output unit 30 switches the voltage outputted to the driver 21 from the high-level voltage to the low-level voltage, the driver 21 turns off the switch 20. More specifically, the driver 21 stops increasing the voltage and electrically connects the gate of the switch 20 to one end of the first resistance R1. With this, the parasitic capacitances Cs and Cd discharge. At this time, the current flows from respective gate-side ends of the parasitic capacitances Cd and Cs to the driver 21 and to the first resistance R1 in this order. The discharge from the parasitic capacitances Cd and Cs allows the voltage of the gate of the switch 20 with respect to the potential of the source to go below the off-voltage. As a result, the switch 20 is turned off.

Suppose that the input voltage value does not satisfy the voltage condition anymore, that is, the period during which the input voltage value is continuously below the first voltage threshold is longer than or equal to the first reference period. In this case, the driver 21 turns off the switch 20 as described above. After this, the driver 21 keeps the switch 20 off regardless of the voltage outputted from the output unit 30, the input voltage value, and the switch current value. Suppose that the switch current value does not satisfy the current condition anymore, that is, the period during which the switch current value continuously exceeds the current threshold is longer than or equal to the second reference period. In this case, the driver 21 turns off the switch 20 as described above. After this, the driver 21 keeps the switch 20 off regardless of the voltage outputted from the output unit 30, the switch current value, and the input voltage value.

The driver 21 outputs the current to the other end of the second resistance R2. The current outputted from the driver 21 flows to the second resistance R2 and to the first resistance R1 in this order. The value of the current outputted from the driver 21 is nearly equal to a value calculated by dividing the switch current value by a predetermined number, such as 1000. The second capacitor C2 is applied, via the third resistance R3, with the voltage of the other end of the second resistance R2 with respect to the ground potential. Then, the second capacitor C2 smoothes out the applied voltage. The analog voltage value of the voltage smoothed out by the second capacitor C2 is inputted to the input unit 31.

The resistance value of the second resistance R2 is sufficiently larger than the resistance value of the first resistance R1 and, for example, at least 100 times the resistance value of the first resistance R1. Accordingly, the voltage value of the other end of the second resistance R2 with respect to the ground potential is nearly equal to the voltage value between the two ends of the second resistance R2. Moreover, the voltage applied to the second capacitor C2 is nearly equal to the voltage value between the two ends of the second resistance R2.

The input unit 31 outputs the input analog voltage value to the A/D conversion unit 33. The A/D conversion unit 33 converts the analog voltage value inputted from the input unit 31 into a digital voltage value. The control unit 35 obtains, from the A/D conversion unit 33, the digital voltage value obtained through the conversion performed by the A/D conversion unit 33. The activation signal and the stop signal are inputted to the input unit 32. When the activation signal or the stop signal is inputted, the input unit 32 notifies the control unit 35 of the input signal.

The storage unit 34 is a nonvolatile memory. The storage unit 34 stores a computer program P1. The control unit 35 has at least one CPU (Central Processing Unit) (not shown). The at least one CPU of the control unit 35 executes the computer program P1 to perform power supply control processing by which power supply to the load 13 is controlled. The computer program P1 is used to cause the at least one CPU of the control unit 35 to perform the power supply control processing.

It should be noted that the computer program P1 may be stored in a storage medium A1 to be readable by the at least one CPU of the control unit 35. In this case, the computer program P1 read from the storage medium A1 by a read-out device (not shown) is stored into the storage unit 34. The storage medium A1 is an optical disk, a flexible disk, a magnetic disk, a magnetic optical disk, or semiconductor memory, for example. The optical disk is a CD-ROM (Compact Disc Read Only Memory), a DVD-ROM (Digital Versatile Disc Read Only Memory), or a BD (Blu-ray [registered trademark] Disc), for example. The magnetic disk is a hard disk, for example. Moreover, the computer program P1 may be downloaded from an external device (not shown) connected to a communication network (not shown). Then, the downloaded computer program P1 may be stored into the storage unit 34.

The control unit 35 periodically performs the power supply control processing. In the power supply control processing, the control unit 35 first determines whether the activation signal is inputted to the input unit 32. If determining that the activation signal is inputted, the control unit 35 instructs the output unit 30 to switch the voltage outputted to the driver 21 to the high-level voltage. In this case, when the input voltage value and the switch current value satisfy the voltage condition and the current condition, respectively, the driver 21 turns on the switch 20. With this, the battery 10 supplies power to the load 13, and the load 13 thus starts operating.

If determining that the activation signal is not inputted, the control unit 35 determines whether the stop signal is inputted to the input unit 32. If determining that the stop signal is inputted, the control unit 35 instructs the output unit 30 to switch the voltage outputted to the driver 21 to the low-level voltage. With this, the driver 21 turns off the switch 20. As a result, power supply to the load 13 stops, and the load 13 thus stops operating.

After instructing the output unit 30 to switch the voltage outputted to the driver 21 to the high-level voltage or the low-level voltage or if determining that the stop signal is not inputted, the control unit 35 obtains the voltage value from the A/D conversion unit 33. The control unit 35 calculates, from the obtained voltage value, a temperature of a wire connecting the positive terminal of the battery 10 to one end of the load 13.

Next, the control unit 35 determines whether the calculated wire temperature is higher than or equal to a fixed temperature threshold. If determining that the calculated wire temperature is higher than or equal to the temperature threshold, the control unit 35 instructs the output unit 30 to switch the voltage outputted to the driver 21 to the low-level voltage regardless of the signal inputted to the input unit 32. With this, the driver 21 turns off the switch 20 and, as a result, power supply to the load 13 stops. After this, the control unit 35 ends the power supply control processing.

Suppose that the control unit 35 ends the power supply control processing after determining that the wire temperature is higher than or equal to the temperature threshold. In this case, the control unit 35 does not execute the power supply control processing and the switch 20 is thus kept off until, for example, the stop signal and the activation signal are inputted to the input unit 32 in this order after the end of the power supply control processing. If determining that the calculated wire temperature is below the temperature threshold, the control unit 35 ends the power supply control processing. In this case, the control unit 35 performs the power supply control processing again when the next timing comes.

In this way, the microcomputer 22 controls power supply to the load 13 by switching the voltage outputted to the driver 21 to the high-level voltage or the low-level voltage on the basis of the signal inputted to the input unit 32 and the calculated wire temperature.

As described above, when the input voltage value and the switch current value satisfy the voltage condition and the current condition, respectively, the driver 21 turns on or off the switch 20 depending on the voltage outputted from the output unit 30 of the microcomputer 22. When the input voltage value does not satisfy the voltage condition anymore or when the switch current value does not satisfy the current condition anymore, the switch 20 is turned off regardless of the voltage outputted from the output unit 30. The following describes the driver 21 in detail.

Figure 3:
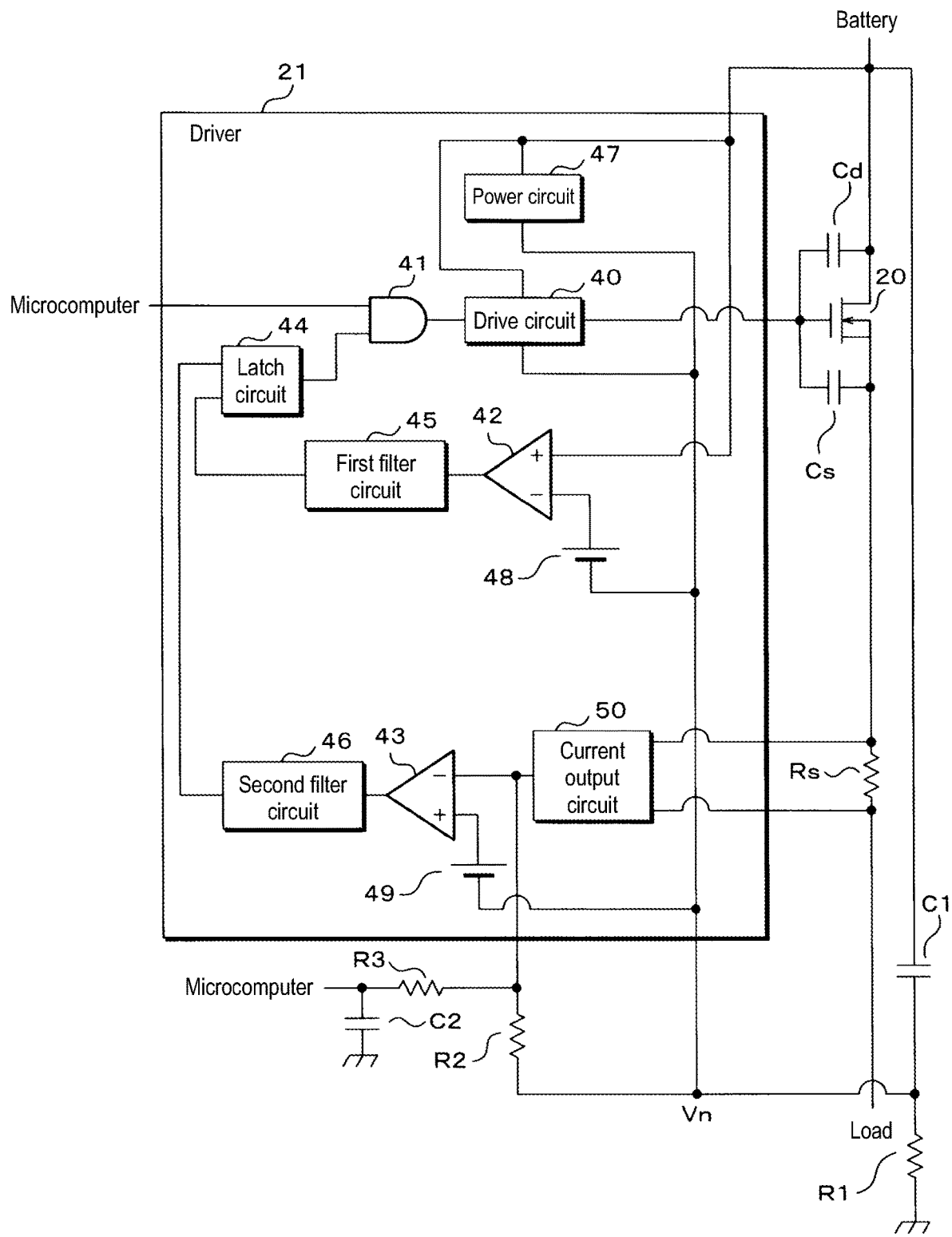
FIG. 3 is a block diagram showing a configuration of main components included in a driver.

FIG. 3 is a block diagram showing a configuration of main components included in the driver 21. The driver 21 includes a drive circuit 40, an AND circuit 41, a first comparator 42, a second comparator 43, a latch circuit 44, a first filter circuit 45, a second filter circuit 46, a power circuit 47, a first voltage source 48 that is a DC voltage source, a second voltage source 49 that is a DC voltage source, and a current output circuit 50. The AND circuit 41 has two input ends and one output end. Each of the first comparator 42 and the second comparator 43 has a plus end, a minus end, and an output end.

The gate of the switch 20 is connected to the drive circuit 40. The drive circuit 40 is further connected to the output end of the AND circuit 41. One input end of the AND circuit 41 is connected to the output unit 30 of the microcomputer 22. The other input end of the AND circuit 41 is connected to the latch circuit 44. The latch circuit 44 is further connected to the first filter circuit 45 and to the second filter circuit 46 separately. The first filter circuit 45 is further connected to the output end of the first comparator 42. The plus end of the first comparator 42 is connected to the drain of the switch 20.

The drain of the switch 20 is further connected to the drive circuit 40 and the power circuit 47. The drive circuit 40 and the power circuit 47 are further connected to the connection node between the first capacitor C1 and the first resistance R1. The minus end of the first comparator 42 is connected to a positive terminal of the first voltage source 48. A negative terminal of the first voltage source 48 is connected to the connection node between the first capacitor C1 and the first resistance R1.

The second filter circuit 46 is further connected to the output end of the second comparator 43. The plus end of the second comparator 43 is connected to a positive terminal of the second voltage source 49. A negative terminal of the second voltage source 49 is connected to the connection node between the first capacitor C1 and the first resistance R1. The minus end of the second comparator 43 is connected to the current output circuit 50. A connection node between the second comparator 43 and the current output circuit 50 is connected to the other end of the second resistance R2. The current output circuit 50 is further connected to one end of the shunt resistance Rs and to the other end of the shunt resistance Rs separately.

The output unit 30 of the microcomputer 22 outputs the high-level voltage or the low-level voltage to one input end of the AND circuit 41. The latch circuit 44 outputs the high-level voltage or the low-level voltage to the other input end of the AND circuit 41. When the latch circuit 44 outputs the high-level voltage, the AND circuit 41 outputs, from the output end to the drive circuit 40, the voltage outputted from the output unit 30 without any change. When the latch circuit 44 outputs the low-level voltage, the AND circuit 41 outputs the low-level voltage from the output end to the drive circuit 40 regardless of the voltage outputted from the output unit 30.

Suppose that the voltage outputted from the AND circuit 41 is switched from the low-level voltage to the high-level voltage. In this case, the drive circuit 40 electrically disconnects the gate of the switch 20 from one end of the first resistance R1 and increases the voltage of the source of the switch 20 with respect to the device potential to the target voltage. The drive circuit 40 outputs the increased voltage to the gate of the switch 20. With this, the parasitic capacitances Cs and Cd are charged. Thus, in the switch 20, the voltage of the gate with respect to the potential of the source becomes higher than or equal to the on-voltage or higher. As a result, the switch 20 is turned on.

Suppose that the voltage outputted from the AND circuit 41 is switched from the high-level voltage to the low-level voltage. In this case, the drive circuit 40 stops increasing the voltage and electrically connects the gate of the switch 20 to one end of the first resistance R1. With this, the parasitic capacitances Cs and Cd discharge. At this time, the current flows from the respective gate-side ends of the parasitic capacitances Cd and Cs to the drive circuit 40 and to the first resistance R1 in this order. The discharge from the parasitic capacitances Cd and Cs allows the voltage of the gate of the switch 20 with respect to the potential of the source to go below the off-voltage. As a result, the switch 20 is turned off.

When the input voltage value and the switch current value satisfy the voltage condition and the current condition, respectively, the latch circuit 44 outputs the high-level voltage. When the latch circuit 44 outputs the high-level voltage, the drive circuit 40 turns on or off the switch 20 depending on the voltage outputted from the output unit 30 of the microcomputer 22. When the input voltage value does not satisfy the voltage condition anymore or when the switch current value does not satisfy the current condition anymore, the latch circuit 44 outputs the low-level voltage. At this time, the AND circuit 41 outputs the low-level voltage regardless of the voltage outputted from the output unit 30 of the microcomputer 22 and the drive circuit 40 turns off the switch 20.

The first comparator 42 compares the input voltage value with the voltage value of the positive terminal of the first voltage source 48 with respect to the device potential. When the input voltage value is larger than or equal to the voltage value of the positive terminal of the first voltage source 48 with respect to the device potential, the first comparator 42 outputs the high-level voltage from the output end to the first filter circuit 45. As described above, the input voltage value is the voltage value of the drain of the switch 20 with respect to the device potential. The voltage value of the positive terminal of the first voltage source 48 with respect to the device potential, that is, the voltage value between the two ends of the first voltage source 48, is the first voltage threshold. The first comparator 42 functions as a comparison unit. When the input voltage value is below the first voltage threshold, the first comparator 42 outputs the low-level voltage from the output end to the first filter circuit 45.

Suppose that the first comparator 42 outputs the high-level voltage or that a period during which the first comparator 42 continuously outputs the low-level voltage is less than the first reference period. In this case, the first filter circuit 45 outputs the high-level voltage to the latch circuit 44. When the period during which the first comparator 42 continuously outputs the low-level voltage becomes longer than or equal to the first reference period, the first filter circuit 45 switches the voltage outputted to the latch circuit 44 to the low-level voltage. After this, when the voltage outputted from the first comparator 42 is switched from the low-level voltage to the high-level voltage, the first filter circuit 45 switches the voltage outputted to the latch circuit 44 from the low-level voltage to the high-level voltage. The first reference period is several hundred μs, for example.

In this way, when the input voltage value satisfies the voltage condition, the first filter circuit 45 outputs the high-level voltage. Then, when the input voltage value does not satisfy the voltage condition anymore, the first filter circuit 45 outputs the low-level voltage.

The current output circuit 50 outputs the current to the other end of the second resistance R2. The current outputted from the current output circuit 50 flows to the second resistance R2 and to the first resistance R1 in this order. The switch current value and the predetermined number are represented by Is and N, respectively. The value of the current outputted from the current output circuit 50 is expressed as "Is/N". This current value increases as the switch current value increases. As described above, the predetermined number N is 1000, for example. The resistance value of the second resistance R2 is represented by r2.

In this case, the voltage value of the other end of the second resistance R2 with respect to the device potential is expressed as "(r2·Is)/N". Here, the symbol "·" indicates multiplication.

The second comparator 43 compares the voltage value of the other end of the second resistance R2 with respect to the device potential, that is, "(r2·Is)/N", with the voltage value of the positive terminal of the second voltage source 49 with respect to the device potential, that is, the voltage value between the two ends of the second voltage source 49. The voltage value between the two ends of the second voltage source 49 is referred to as the second voltage threshold Vr2. The second voltage threshold Vr2 is a fixed value. When the switch current value Is satisfies "Vr2≥(r2·Is)/N", that is, "Is≤(Vr2·N)/r2", the second comparator 43 outputs the high-level voltage from the output end to the second filter circuit 46. The second comparator 43 functions as a second comparison unit.

When the switch current value Is satisfies "Vr2≤(r2·Is)/N", that is, "Is>(Vr2·N)/r2", the second comparator 43 outputs the low-level voltage from the output end to the second filter circuit 46. The aforementioned current threshold is expressed as "(Vr2·N)/r2".

In the power supply control device 12, one end of the second resistance R2 and the negative terminal of the second voltage source 49 are connected to the connection node between the first capacitor C1 and the first resistance R1, as described above. Thus, regardless of the device potential voltage value, the second comparator 43 appropriately compares the voltage value of the other end of the second resistance R2 with respect to the device potential with the voltage value of the positive terminal of the second voltage source 49 with respect to the device potential.

Suppose that the second comparator 43 outputs the high-level voltage or that the period during which the second comparator 43 continuously outputs the low-level voltage is less than the second reference period. In this case, the second filter circuit 46 outputs the high-level voltage to the latch circuit 44. When the period during which the second comparator 43 continuously outputs the low-level voltage becomes longer than or equal to the second reference period, the second filter circuit 46 switches the voltage outputted to the latch circuit 44 to the low-level voltage. After this, when the voltage outputted from the second comparator 43 is switched from the low-level voltage to the high-level voltage, the second filter circuit 46 switches the voltage outputted to the latch circuit 44 from the low-level voltage to the high-level voltage. The second reference period is several hundred μs.

In this way, when the switch current value satisfies the current condition, the second filter circuit 46 outputs the high-level voltage. Then, when the switch current value does not satisfy the current condition anymore, the second filter circuit 46 outputs the low-level voltage.

Suppose that both the first filter circuit 45 and the second filter circuit 46 output the high-level voltage to the latch circuit 44, that is, that the input voltage value and the switch current value satisfy the voltage condition and the current condition, respectively. In this case, the latch circuit 44 outputs the high-level voltage to the AND circuit 41. Here, as described above, the AND circuit 41 outputs, to the drive circuit 40, the voltage outputted from the output unit 30 without any change. Then, the drive circuit 40 turns on or off the switch 20 depending on the voltage outputted from the output unit 30.

Suppose that at least one of the first filter circuit 45 and the second filter circuit 46 outputs the low-level voltage.

More specifically, suppose that the input voltage value does not satisfy the voltage condition anymore or that the switch current value does not satisfy the current condition anymore. In this case, the latch circuit 44 switches the voltage outputted to the AND circuit 41 to the low-level voltage. In this case, the AND circuit 41 outputs the low-level voltage regardless of the voltage outputted from the output unit 30 and the drive circuit 40 turns off the switch 20 as described above. The drive circuit 40 functions as a switching unit. After switching the voltage outputted to the AND circuit 41 to the low-level voltage, the latch circuit 44 continuously outputs the low-level voltage to the AND circuit 41 regardless of the voltages outputted from the first filter circuit 45 and the second filter circuit 46.

Even when disturbance noise causes the input voltage value to be temporarily below the first voltage threshold and thus the first comparator 42 outputs the low-level voltage, the first filter circuit 45 continuously outputs the high-level voltage. Moreover, even when disturbance noise causes the switch current value to temporarily exceed the current threshold and thus the second comparator 43 outputs the low-level voltage, the second filter circuit 46 continuously outputs the high-level voltage. Thus, the temporary decrease in the input voltage value or the temporary increase in the switch current value does not cause the drive circuit 40 to turn off the switch 20.

It should be noted that the value of the current outputted from the current output circuit 50 to the second resistance R2 is limited by the output voltage value of the battery 10. Thus, the voltage value of the other end of the second resistance R2 with respect to the ground potential is less than the output voltage value of the battery 10 and does not reach or exceed the output voltage value of the battery 10. Accordingly, when the output voltage value of the battery 10 is small, the switch current value indicated by the voltage value between the two ends of the second resistance R2 may possibly be smaller than the actual switch current value. As a result, although the switch current value exceeds the current threshold, the second comparator 43 may possibly output the high-level voltage to the second filter circuit 46.

For example, suppose that the output voltage of the battery 10 sufficiently decreases before the expiration of the second reference period after the decrease in the output voltage of the battery 10 due to a short circuit between the two ends of the load. In this case, the second comparator 43 cannot continuously output the low-level voltage for the second reference period. For this reason, the second filter circuit 46 does not output the high-level voltage, and the function of protecting the switch 20 from an overcurrent stops.

The battery 10 supplies power to the power circuit 47. The power circuit 47 is connected to the drive circuit 40, the AND circuit 41, the first comparator 42, the second comparator 43, the latch circuit 44, the first filter circuit 45, the second filter circuit 46, and the current output circuit 50. In FIG. 3, these connection lines are omitted for brevity.

The power circuit 47 monitors the input voltage value. When the input voltage value is larger than or equal to a predetermined cut-off voltage value, the power circuit 47 supplies power to the drive circuit 40, the AND circuit 41, the first comparator 42, the second comparator 43, the latch circuit 44, the first filter circuit 45, the second filter circuit 46, and the current output circuit 50. These structural components operate using power supplied from the power circuit 47.

Suppose that the input voltage value is less than the cut-off voltage value. In this case, to eliminate a possibility of unstable operation of the driver 21, the power circuit 47 stops power supply to the drive circuit 40, the AND circuit 41, the first comparator 42, the second comparator 43, the latch circuit 44, the first filter circuit 45, the second filter circuit 46, and the current output circuit 50. With this, these structural components stop operating. Each of the first voltage threshold and the cut-off voltage value is with respect to the device potential. The cut-off voltage value is less than the first voltage threshold.

Figure 4:
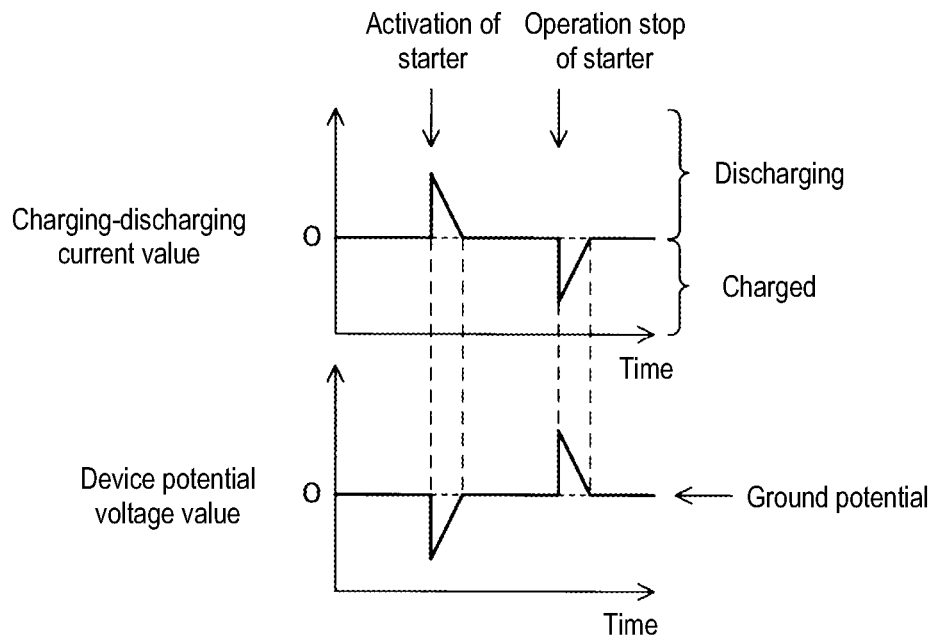
FIG. 4 is a timing chart illustrating fluctuations of a device potential voltage value in response to operation of a starter.

Hereinafter, operation of the driver 21 is described. FIG. 4 is a timing chart illustrating fluctuations of the device potential voltage value in response to operation of the starter 11. As described above, the device potential voltage value is the voltage value of the connection node with respect to the ground potential. This connection node refers to the node between the first capacitor C1 and the first resistance R1. The value of the current flowing from one end or the other end of the first capacitor C1 is referred to as the charging-discharging current value. The chart in FIG. 4 shows the progression of the charging-discharging current value and the device potential voltage value. To show the progression of these values, the horizontal axis represents the time. When the first capacitor C1 discharges, the charging-discharging current value is a positive value. When the first capacitor C1 is charged, the charging-discharging current value is a negative value.

Suppose that the two ends of the load 13 are not short-circuited and that the starter 11 is not running. In this case, the current flows from the positive terminal of the battery 10 to the first capacitor C1 and to the first resistance R1 in this order, and the battery 10 thus charges the first capacitor C1. The first capacitor C1 is charged until the voltage value between the two ends of the first capacitor C1 becomes equal to the output voltage value of the battery 10. When the voltage value between the two ends of the first capacitor C1 is equal to the output voltage value of the battery 10, no current flows via the first capacitor C1 and the first resistance R1 and thus the charging-discharging current value is 0 A. Generally speaking, the charging-discharging current value is 0 A. At this time, the device potential is equal to the ground potential, and the device potential voltage value is 0 V.

As described above, when the starter 11 is activated, the output voltage value of the battery 10 decreases. Then, the current flows from one end of the first capacitor C1 to the battery 10, and thus the first capacitor C1 discharges. Accordingly, upon activation of the starter 11, the charging-discharging current value increases. The discharge from the first capacitor C1 decreases the voltage value between the two ends of the first capacitor C1. As the voltage value between the two ends of the first capacitor C1 decreases, the charging-discharging current value also decreases. When the voltage value between the two ends of the first capacitor C1 becomes equal to the output voltage value of the battery 10, the charging-discharging current value becomes 0 A. While the charging-discharging current value is a positive current value, that is, while the first capacitor C1 is discharging, the current flows to the first resistance R1 and to the first capacitor C1 in this order. Thus, the device potential voltage value is a negative value, and the device potential is lower than the ground potential.

An absolute value of the device potential voltage value is expressed as a product of the voltage value between the two ends of the first resistance R1, that is, the resistance value of the first resistance R1, and an absolute value of the charging-discharging current value. The resistance value of the first resistance R1 is constant. Thus, the absolute value of the device potential voltage value is proportional to the absolute value of the charging-discharging current value. Upon activation of the starter 11, the device potential voltage value decreases as the charging-discharging current value increases. After this, the device potential voltage value increases as the absolute value of the charging-discharging current value decreases. When the charging-discharging current value becomes 0 A, the device potential voltage value becomes 0 V and the device potential becomes equal to the ground potential.

As described above, when the starter 11 stops operating, the output voltage value of the battery 10 increases. Then, the current flows from the positive terminal of the battery 10 to the first capacitor C1, and the battery 10 thus charges the first capacitor C1. Upon activation of the starter 11, the charging-discharging current value is a negative value and the absolute value of the charging-discharging current value increases. The charging of the first capacitor C1 increases the voltage value between the two ends of the first capacitor C1. As the voltage value between the two ends of the first capacitor C1 increases, the absolute value of the charging-discharging current value decreases. When the voltage value between the two ends of the first capacitor C1 becomes equal to the output voltage value of the battery 10, the charging-discharging current value becomes 0 A. While the charging-discharging current value is a negative current value, that is, while the battery 10 is charging the first capacitor C1, the current flows to the first capacitor C1 and to the first resistance R1 in this order. Thus, the device potential voltage value is a positive value, and the device potential is higher than the ground potential.

As described above, the absolute value of the device potential voltage value is proportional to the absolute value of the charging-discharging current value. Upon operation stop of the starter 11, the device potential voltage value increases as the absolute value of the charging-discharging current value increases. After this, the device potential voltage value decreases as the absolute value of the charging-discharging current value decreases. When the charging-discharging current value becomes 0 A, the device potential voltage value becomes 0 V and the device potential becomes equal to the ground potential.

Figure 5:
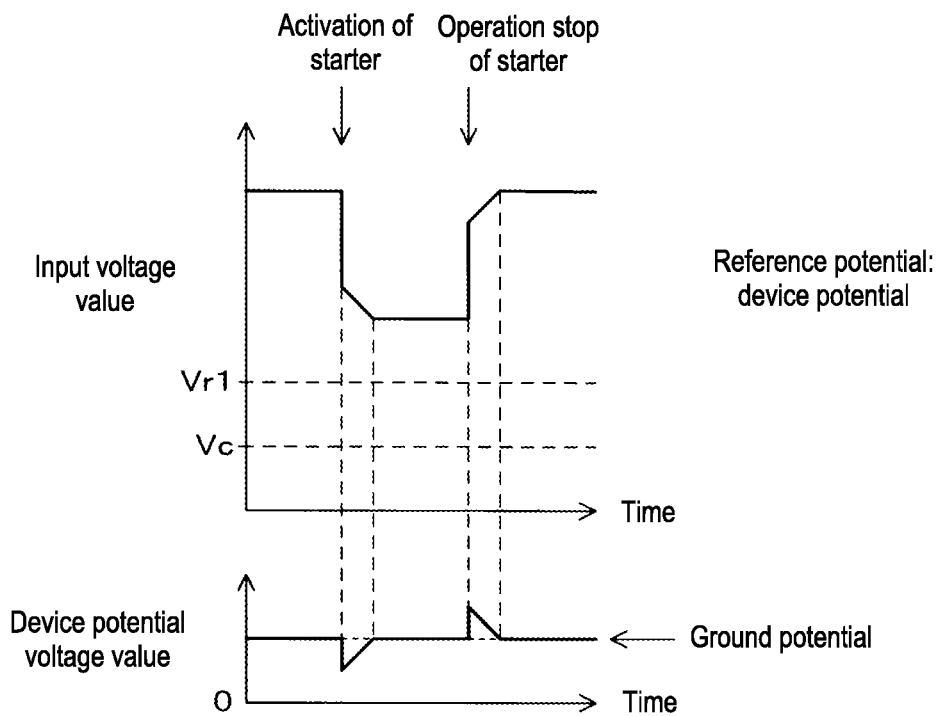
FIG. 5 is a timing chart illustrating fluctuations of an input voltage value in response to operation of a starter.

FIG. 5 is a timing chart illustrating fluctuations of the input voltage value in response to operation of the starter 11. The chart in FIG. 5 shows the progression of the input voltage value and the device potential voltage value. To show the progression of these values, the horizontal axis represents the time. As described above, the device potential voltage value temporarily decreases immediately after activation of the starter 11 and then returns to 0 V afterwards. Moreover, the device potential voltage value temporarily increases immediately after operation stop of the starter 11 and then returns to 0 V afterwards.

Upon activation of the starter 11, the output voltage value of the battery 10 with respect to the ground potential decreases, and the input voltage value decreases. While the starter 11 is running, the input voltage value is smaller than immediately before activation of the starter 11. Moreover, upon operation stop of the starter 11, the output voltage value of the battery 10 with respect to the ground potential increases, and the input voltage value increases.

As described above, the input voltage value is with respect to the device potential. Upon activation of the starter 11, the device potential voltage value is temporarily a negative voltage value. Thus, while the device potential voltage value is a negative voltage value, a decrease with respect to the input voltage value immediately before activation of the starter 11 is small. Moreover, upon operation stop of the starter 11, the device potential voltage value is temporarily a positive voltage value. Thus, while the device potential voltage value is a positive voltage value, the input voltage value is smaller than immediately before activation of the starter 11.

It should be noted that each of a period during which the device potential voltage value is a negative voltage value immediately after activation of the starter 11 and a period during which the device potential voltage value is a positive voltage value immediately after operation stop of the starter 11 is several microseconds. On the other hand, a period during which the starter 11 is running is several seconds. Accordingly, each of the period during which the device potential voltage value is a negative voltage value and the period during which the device potential voltage value is a positive voltage value is significantly shorter than the period during which the starter 11 is running.

As described above, the first voltage threshold Vr1 refers to the voltage value between the two ends of the first voltage source 48, and is with respect to the device potential. The first voltage threshold Vr1 is less than a minimum value of the input voltage value during a period in which the starter 11 is running. Accordingly, upon activation of the starter 11, the input voltage value does not fall below the first voltage threshold Vr1. Thus, activation of the starter 11 does not cause the drive circuit 40 to mistakenly turn off the switch 20. The cut-off voltage Vc is less than the first voltage threshold Vr1 as described above.

Next, operation performed by the driver 21 when the two ends of the load 13 are short-circuited is described. First, the following describes the operation performed by the driver 21 of the power supply control device 12 when the first capacitor C1 and the first resistance R1 are not provided and the device potential is equal to the ground potential. Since the drive circuit 40, the power circuit 47, the negative terminal of the first voltage source 48, the negative terminal of the second voltage source 49, and one end of the second resistance R2 are grounded, the device potential is equal to the ground potential.

Figure 6:
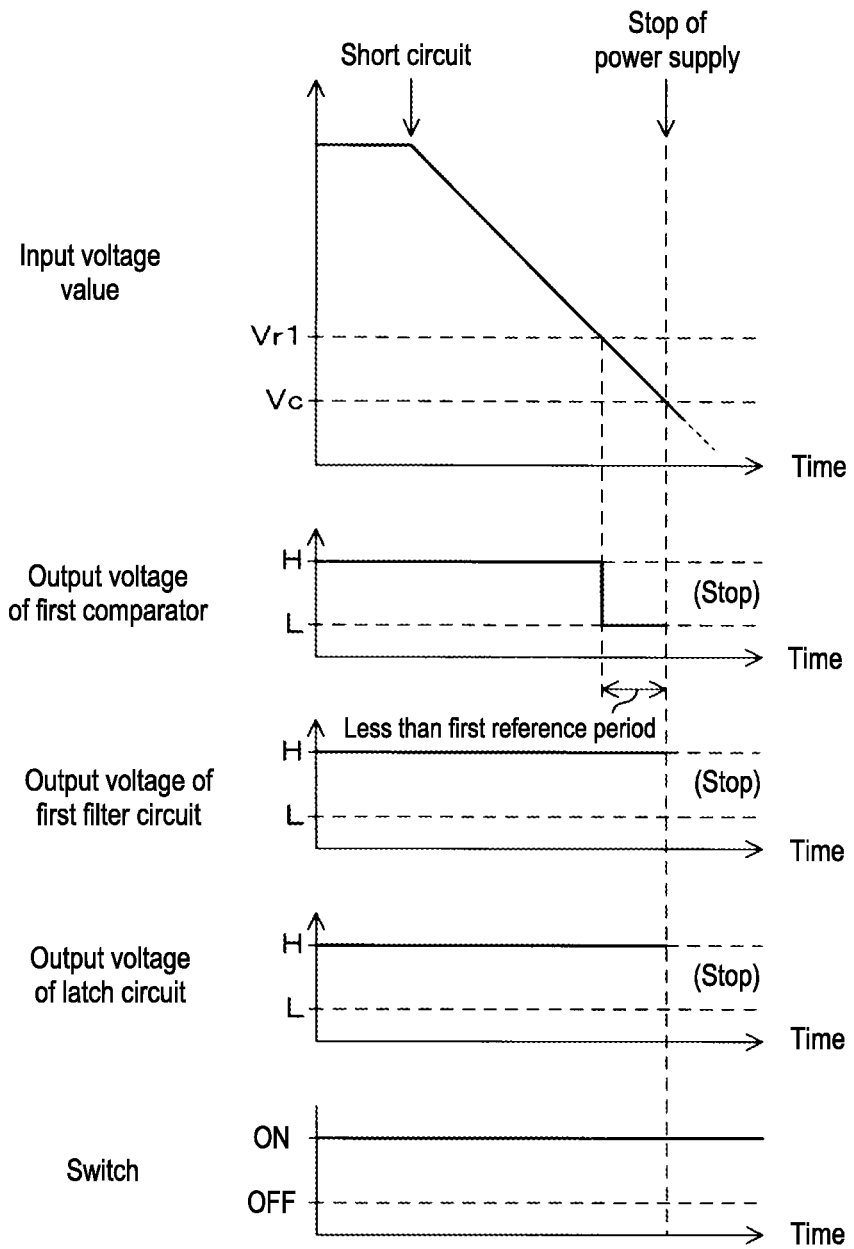
FIG. 6 is a timing chart illustrating operation of the driver performed when a device potential is equal to a ground potential.

FIG. 6 is a timing chart illustrating operation of the driver 21 performed when the device potential is equal to the ground potential. The chart in FIG. 6 shows the progression of the input voltage value, the progression of the output voltage values of the first comparator 42, the first filter circuit 45, and the latch circuit 44, and the progression of when the switch 20 is on and off. To show the progression of these values, the horizontal axis represents the time. The timescale shown in FIG. 6 is smaller than the timescales shown in FIG. 4 and FIG. 5. In FIG. 6, the timescale is on the order of microseconds. In each of FIG. 4 and FIG. 5, the timescale is on the order of seconds. In FIG. 6, the high-level voltage is indicated as "H" and the low-level voltage is indicated as "L".

Suppose that the output unit 30 of the microcomputer 22 outputs the high-level voltage. When the input voltage value and the switch current value satisfy the voltage condition and the current condition, respectively, the drive circuit 40 keeps the switch 20 on. When the two ends of the load 13 are not short-circuited, the input voltage value is larger than or equal to the first voltage threshold Vr1 and the first comparator 42, the first filter circuit 45, and the latch circuit 44 output the high-level voltage.

When the two ends of the load 13 are short-circuited, a large current flows from the positive terminal of the battery 10 via the switch 20. As a result, the output voltage value of the battery 10 decreases and the input voltage value decreases. Here, suppose that the output voltage value of the battery 10 rapidly decreases. When the two ends of the load 13 are short-circuited, the switch current value exceeds the current threshold. However, the output voltage value of the battery 10 rapidly decreases and the value of the current outputted from the current output circuit 50 is limited by the output voltage value of the battery 10 as described above. For this reason, although the switch current value exceeds the current threshold, the second comparator 43 cannot continuously output the high-level voltage for the second reference period.

As a result, the second filter circuit 46 continuously outputs the high-level voltage. In this case, the second comparator 43, the second filter circuit 46, and the current output circuit 50 do not operate appropriately. Thus, to protect the switch 20 from an overcurrent, the switch 20 needs to be turned off depending on the input voltage value.

When the input voltage value becomes less than the first voltage threshold Vr1, the first comparator 42 switches the voltage outputted to the first filter circuit 45 to the low-level voltage. After this, the first comparator 42 continuously outputs the low-level voltage. Here, the input voltage value rapidly decreases. Accordingly, before the period during which the first comparator 42 outputs the low-level voltage to the first filter circuit 45 becomes longer than or equal to the first reference period, the input voltage value becomes less than the cut-off voltage value.

When the input voltage value becomes less than the cut-off voltage value, the power circuit 47 stops power supply to eliminate a possibility of unstable operation of the driver 21. With this, the drive circuit 40, the AND circuit 41, the first comparator 42, the second comparator 43, the latch circuit 44, the first filter circuit 45, the second filter circuit 46, and the current output circuit 50 stop operating.

When stopping operating, the drive circuit 40 stops increasing the input voltage value. However, the drive circuit 40 disconnects the gate of the switch 20 from one end of the first resistance R1 and maintains disconnection of the gate of the switch 20 from one end of the first resistance R1. Thus, the parasitic capacitances Cs and Cd do not discharge, and the voltage of the gate in the switch 20 with respect to the potential of the source is maintained at the on-voltage value or higher to keep the switch 20 on. With this, the switch 20 cannot be protected from an overcurrent. The smaller the difference between the first voltage threshold Vr1 and the cut-off voltage value Vc is, the shorter the period during which the first comparator 42 outputs the low-level voltage is. For this reason, it is difficult to protect the switch 20 from an overcurrent.

For the power supply control device 12 in which the device potential is different from the ground potential, the driver 21 protects the switch 20 from an overcurrent even if the output voltage value of the battery 10 rapidly decreases. Hereinafter, operation performed by the driver 21 of the power supply control device 12 is described.

Figure 7:
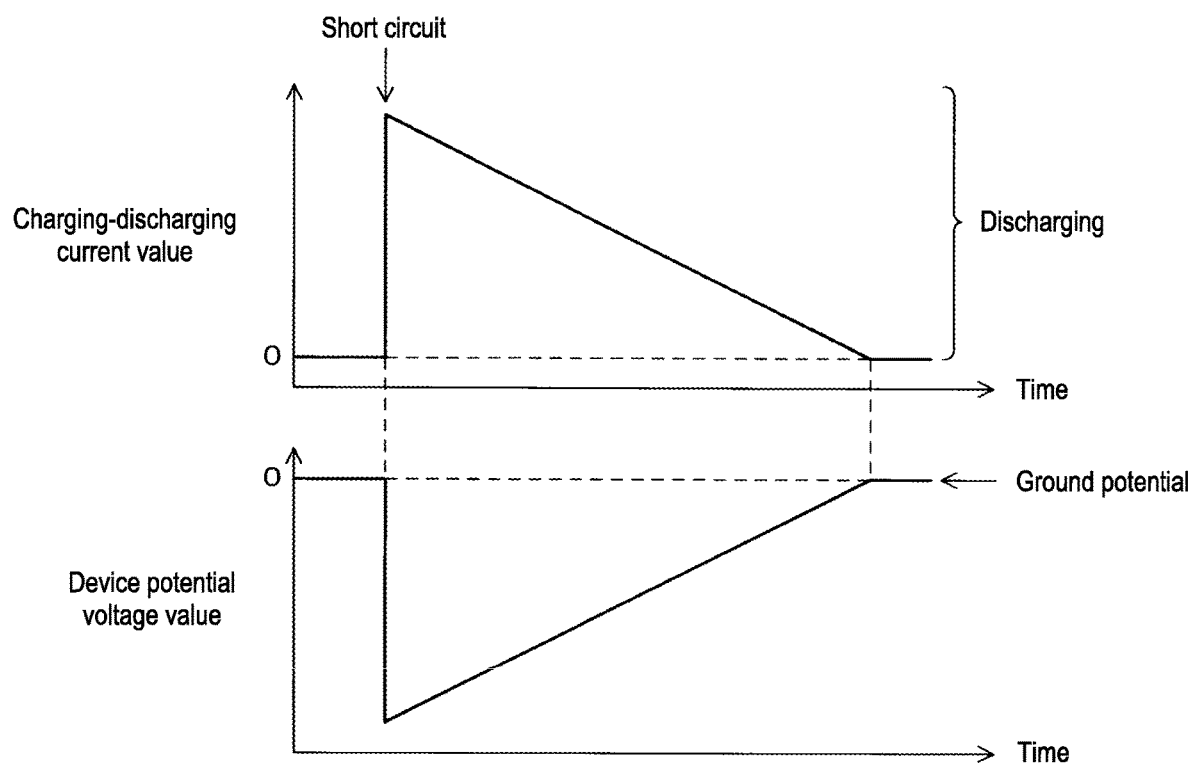
FIG. 7 is a timing chart illustrating fluctuations of the device potential voltage value when two ends of a load are short-circuited.

FIG. 7 is a timing chart illustrating fluctuations of the device potential voltage value when the two ends of the load 13 are short-circuited. The chart in FIG. 7 shows the progression of the charging-discharging current value and the device potential voltage value. To show the progression of these values, the horizontal axis represents the time. As in FIG. 4, when the first capacitor C1 discharges, the charging-discharging current value is a positive value. When the first capacitor C1 is charged, the charging-discharging current value is a negative value. As in FIG. 6, the timescale shown in FIG. 7 is on the order of microseconds.

Suppose that the voltage value between the two ends of the first capacitor C1 is equal to the output voltage value of the battery 10. In this case, regardless of whether the switch 20 is on, the charging-discharging current value is 0 A, the device potential voltage value is 0 V, and the device potential is equal to the ground potential. When the two ends of the load 13 are short-circuited while the switch 20 is on, the current flows from the battery-side end of the first capacitor C1 to the switch 20 and to the shunt resistance Rs in this order. Then, the first capacitor C1 discharges. With this, at the moment when the two ends of the load 13 are short-circuited, the charging-discharging current value increases.

The discharge from the first capacitor C1 decreases the voltage value between the two ends of the first capacitor C1. As the voltage value between the two ends of the first capacitor C1 decreases, the charging-discharging current value also decreases. When the voltage value between the two ends of the first capacitor C1 becomes 0 V, the charging-discharging current value becomes 0 A. While the charging-discharging current value is a positive current value, that is, while the first capacitor C1 is discharging, the current flows to the first resistance R1 and to the first capacitor C1 in this order. Thus, the device potential voltage value is a negative value, and the device potential is lower than the ground potential.

The absolute value of the device potential voltage value is expressed as the product of the resistance value of the first resistance R1 and the charging-discharging current value, as described above. The resistance value of the first resistance R1 is constant. Thus, the absolute value of the device potential voltage value is proportional to the charging-discharging current value.

At the moment when the two ends of the load 13 are short-circuited, the device potential voltage value decreases as the charging-discharging current value increases. After this, the device potential voltage value increases as the charging-discharging current value decreases. When the charging-discharging current value becomes 0 A, the device potential voltage value becomes 0 V and the device potential becomes equal to the ground potential.

Figure 8:
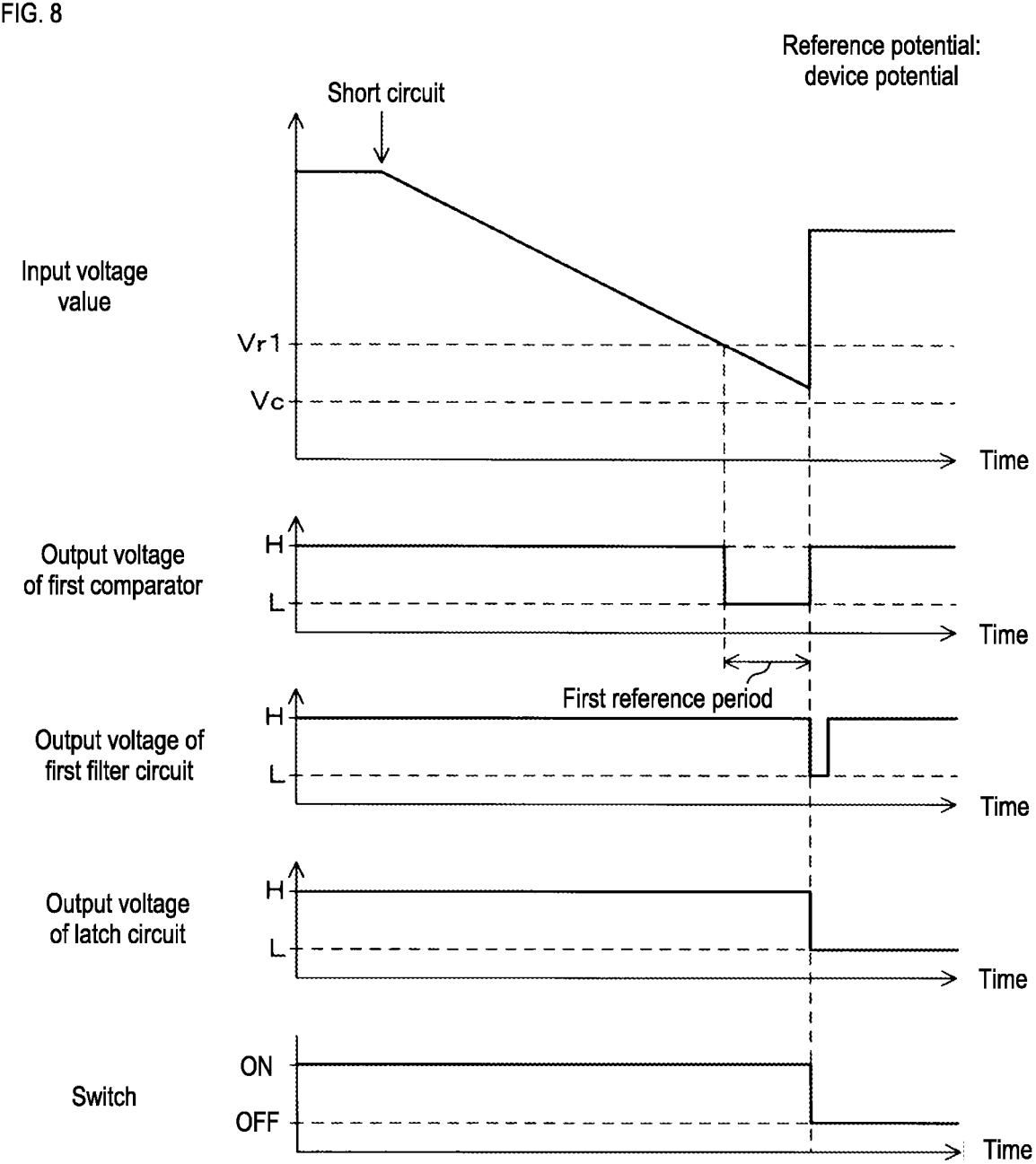
FIG. 8 is a timing chart illustrating operation of the driver performed when the two ends of the load are short-circuited.

FIG. 8 is a timing chart illustrating operation of the driver 21 when the two ends of the load 13 are short-circuited. FIG. 8 corresponds to FIG. 6. As with the chart in FIG. 6, the chart in FIG. 8 shows the progression of the input voltage value, the progression of the output voltage values of the first comparator 42, the first filter circuit 45, and the latch circuit 44, and the progression of when the switch 20 is on and off. To show the progression of these values, the horizontal axis represents the time. As in FIG. 6, the timescale shown in FIG. 8 is on the order of microseconds. In FIG. 8, the high-level voltage is indicated as "H" and the low-level voltage is indicated as "L" as well.

Suppose that the output unit 30 of the microcomputer 22 outputs the high-level voltage. When the input voltage value and the switch current value satisfy the voltage condition and the current condition, respectively, the drive circuit 40 keeps the switch 20 on. When the two ends of the load 13 are not short-circuited, the input voltage value is larger than or equal to the first voltage threshold Vr1 and the first comparator 42, the first filter circuit 45, and the latch circuit 44 output the high-level voltage.

When the two ends of the load 13 are short-circuited, a large current flows from the positive terminal of the battery 10 via the switch 20. As a result, the output voltage value of the battery 10 decreases and the input voltage value decreases. When the two ends of the load 13 are short-circuited, the first capacitor C1 discharges and the device potential voltage value becomes a negative voltage value in the power supply control device 12 as shown in FIG. 7. After this, the device potential voltage value slowly increases with the passage of time and then returns to 0 V. Thus, after the short circuit of the two ends of the load 13, the input voltage value slowly decreases.

When the input voltage value becomes less than the first voltage threshold Vr1, the first comparator 42 switches the voltage outputted to the first filter circuit 45 to the low-level voltage. After this, the first comparator 42 continuously outputs the low-level voltage. Here, the input voltage value slowly decreases. Accordingly, before the input voltage value becomes less than the cut-off voltage value, the period during which the first comparator 42 outputs the low-level voltage to the first filter circuit 45 reliably becomes longer than or equal to the first reference period.

When the period during which the first comparator 42 outputs the low-level voltage to the first filter circuit 45 becomes longer than or equal to the first reference period, the first filter circuit 45 switches the voltage outputted to the latch circuit 44 to the low-level voltage. With this, the latch circuit 44 switches the voltage outputted to the AND circuit 41 to the low-level voltage. Then, the AND circuit 41 switches the voltage outputted to the drive circuit 40 to the low-level voltage regardless of the voltage outputted from the output unit 30 of the microcomputer 22. The drive circuit 40 electrically connects the gate of the switch 20 to one end of the first resistance R1. Thus, the parasitic capacitances Cs and Cd discharge, and the voltage of the gate in the switch 20 with respect to the potential of the source becomes less than the off-voltage value. With this, the switch 20 is turned off.

When the switch 20 is turned off, the value of the current outputted from the battery 10 decreases. Thus, the voltage drop occurring to the internal resistance of the battery 10 decreases in magnitude and the output voltage value of the battery 10 becomes larger than or equal to the first voltage threshold Vr1. With this, the first comparator 42 switches the voltage outputted to the first filter circuit 45 to the high-level voltage, and the first filter circuit 45 switches the voltage outputted to the latch circuit 44 to the high-level voltage.

After switching the voltage outputted to the AND circuit 41 to the low-level voltage, the latch circuit 44 continuously outputs the low-level voltage to the AND circuit 41 regardless of the voltages outputted from the first filter circuit 45 and the second filter circuit 46, as described above. Thus, the drive circuit 40 keeps the switch off.

For the power supply control device 12, the first voltage threshold Vr1 is less than the minimum value of the input voltage value during the period in which the starter 11 is running, as described above. Thus, activation of the starter 11 does not cause the drive circuit 40 to mistakenly turn off the switch 20. Moreover, suppose that the short circuit of the load 13 causes a large current to flow via the switch 20 and thus causes the input voltage value to be less than the first voltage threshold, for example. In this case, the switch 20 is turned off and the passage of the current via the switch 20 is thus interrupted. The switch 20 is protected from an overcurrent. In this way, the drive circuit 40 in the power supply control device 12 appropriately turns off the switch 20 depending on the input voltage value.

Furthermore, when the two ends of the load 13 are short-circuited, the power circuit 47 does not stop power supply to the drive circuit 40 before the period during which the input voltage value is continuously less than the voltage threshold reaches the first reference period. Before the power circuit 47 stops power supply to the drive circuit 40, the drive circuit 40 reliably turns off the switch 20.

It should be noted that the switch 20 is not limited to the N-channel FET, and may be a P-channel FET or a bipolar transistor, for example. When the switch 20 is a P-channel FET, the source of the switch 20 is connected to the positive terminal of the battery 10 and the drain of the switch 20 is connected to one end of the shunt resistance Rs.

In this case, the source of the switch 20 is the current input end, and the voltage value of the source of the switch 20 with respect to the device potential is the input voltage value. The drive circuit 40 causes the parasitic capacitances Cs and Cd to be charged so that the switch 20 is turned off. Moreover, the drive circuit 40 causes the parasitic capacitances Cs and Cd to discharge so that the switch 20 is turned on. When power supply to the drive circuit 40 stops while the switch 20 is on, the switch 20 is kept on since the parasitic capacitances Cs and Cd are not charged.

The embodiment disclosed thus far only describes an example in all respects and is not intended to limit the scope of the present disclosure. It is intended that the scope of the present disclosure not be limited by the meanings described above, but be defined by the claims set forth below. Meanings equivalent to the description of the claims and all modifications are intended for inclusion within the scope of the following claims.

What is claimed is:

1. A power supply control device, comprising:
    a capacitor having one end connected to a current input end of a switch;
    a resistance having one end connected to another end of the capacitor;
    a DC voltage source having a negative terminal connected to a connection node between the capacitor and the resistance;
    the switch disposed in a first current path of a current flowing from a direct-current (DC) power source, the switch configured to turn on so as to supply power from the DC power source to a load;
    a comparison unit configured to compare a voltage value of a current input end of the switch to which the current is inputted with a voltage threshold, wherein the voltage threshold is a voltage value of a positive terminal of the DC voltage source; and
    a switching unit configured to turn off the switch when the comparison unit indicates that the voltage value of the current input end is less than the voltage threshold so as to interrupt power from the DC power source to the load,
    wherein the DC power source is configured to supply, via a second current path, power to a starter that starts an engine of a vehicle, and
    the voltage threshold is less than the voltage value of the current input end of the switch in a case where the DC power source supplies the power to the starter; and
    wherein the switching unit is further configured to turn off the switch when the comparison unit indicates continuously for at least a predetermined period that the voltage value of the current input end is less than the voltage threshold.

2. The power supply control device according to claim 1, comprising:
    a power circuit supplying power to the switching unit,
    wherein the power circuit is configured to stop power supply to the switching unit when the voltage value of the current input end of the switch is less than a predetermined voltage value, and the predetermined voltage value is less than the voltage threshold.

3. The power supply control device according to claim 1, comprising:
- a second resistance having one end connected to the connection node;
- a current output circuit outputting, to the another end of the second resistance, a current increasing when a value of the current flowing via the switch increases;
- a second DC voltage source having a negative terminal connected to the connection node; and
- a second comparison unit configured to compare a voltage value of the other end of the second resistance with a voltage value of a positive terminal of the second DC voltage source,
- wherein the switching unit is configured to turn off the switch when the second comparison unit indicates that the voltage value of the other end of the second resistance exceeds the voltage value of the positive terminal of the second DC voltage source.

4. The power supply control device according to claim 2, comprising:
- a second resistance having one end connected to the connection node;
- a current output circuit outputting, to the other end of the second resistance, a current increasing when a value of the current flowing via the switch increases;
- a second DC voltage source having a negative terminal connected to the connection node; and
- a second comparison unit configured to compare a voltage value of the other end of the second resistance with a voltage value of a positive terminal of the second DC voltage source,
- wherein the switching unit is configured to turn off the switch when the second comparison unit indicates that the voltage value of the other end of the second resistance exceeds the voltage value of the positive terminal of the second DC voltage source.

* * * * *